Figure 1:
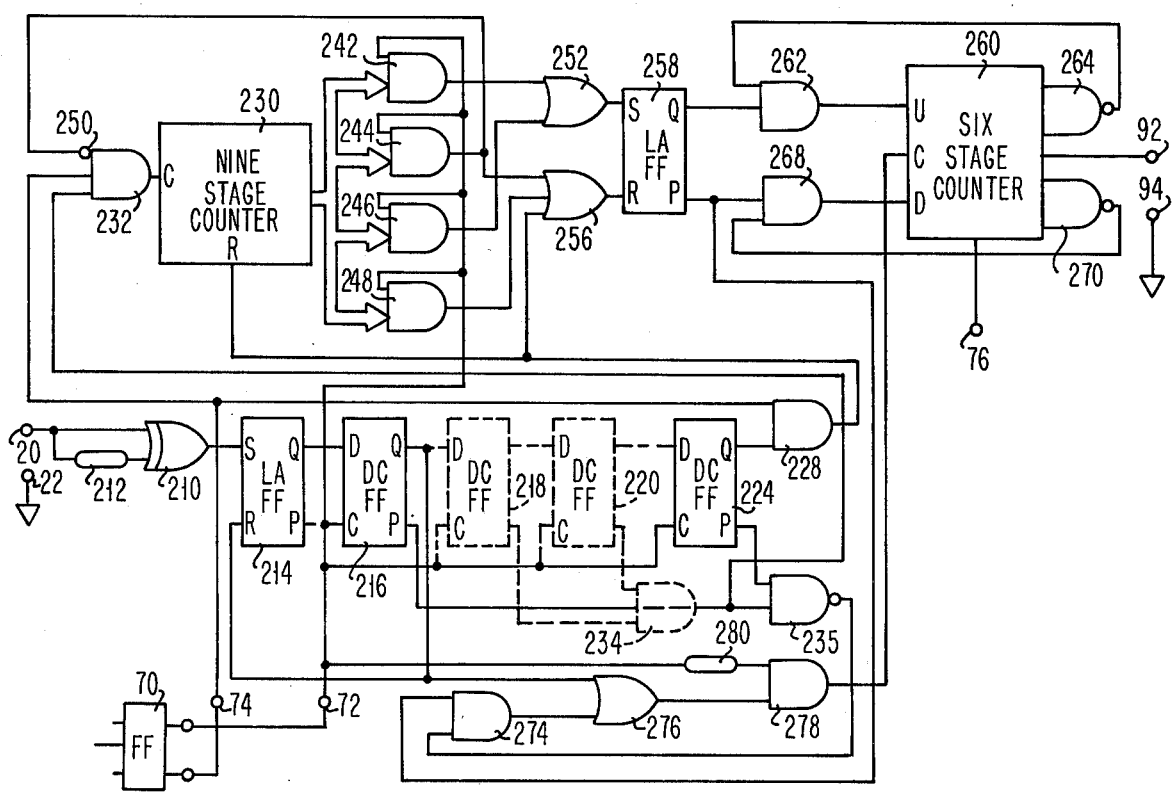

United States Patent [19]

Svelund

[11] 4,068,174
[45] Jan. 10, 1978

[54] DIGITAL CARRIER WAVE DETECT CIRCUITRY

[75] Inventor: Lawrence Eugene Svelund, San Jose, Calif.

[73] Assignee: International Business Machines Corporation, Armonk, N.Y.

[21] Appl. No.: 772,613

[22] Filed: Feb. 28, 1977

Related U.S. Application Data

[63] Continuation of Ser. No. 663,403, March 3, 1976, abandoned.

[51] Int. Cl.² .......................................... H04L 25/00
[52] U.S. Cl. ..................................... 325/325; 178/88
[58] Field of Search ................. 178/88, 68; 325/38 R, 325/321, 322, 325; 328/37, 39, 148; 307/220, 221 R, 224 R

[56] References Cited

U.S. PATENT DOCUMENTS

| | | | |
|---|---|---|---|
| 3,548,328 | 12/1970 | Breikss | 329/126 |
| 3,571,712 | 3/1971 | Hellwarth et al. | 325/320 |
| 3,600,680 | 8/1971 | Maniere et al. | 325/18 |
| 3,746,993 | 7/1973 | Ahmed et al. | 325/320 |
| 3,766,479 | 10/1973 | Thalimer et al. | 325/320 |
| 3,883,687 | 5/1975 | Stenstrom | 325/325 |

*Primary Examiner*—Benedict V. Safourek
*Attorney, Agent, or Firm*—George E. Roush

[57] ABSTRACT

Readily available digital logical circuit components are arranged in circuitry for enhancing demodulation of frequency shifted or phase shifted modulation signals in the presence of a received carrier wave and inhibiting demodulation in the absence of any recognized carrier wave. The circuitry is arranged for measuring the time between adjacent impulses as received including noise impulses which penetrate an input band-pass filter. The preponderance of signal impulses lie within predeterminable limits, however, and the circuitry is arranged for indicating the presence of a data signal despite some noise impulses passing through the filter. The electronic circuit components are conventional and also are readily laid down in semi-conductor structures of the popular types.

15 Claims, 2 Drawing Figures

DIGITAL CARRIER WAVE DETECT CIRCUITRY

The instant application is a continuation of U.S. patent application Ser. No. 663,403 filed on Mar. 3, 1976 and now abandoned.

The invention is directed to digital carrier wave detect circuitry for digital receiving systems of the type described and illustrated in U.S. Pat. No. 3,571,712 to George A. Hellworth and Gardner D. Jones issued on Mar. 23, 1971 for "Digital FSK/PSK Detector".

The invention relates to the detection of the presence or absence of a modulated carrier wave, and it particularly pertains to detecting circuits for carrier waves modulated by digitalized binary signals, such as those transmitted in both directions through the use of modems.

Carrier detecting circuit arrangements are known. Most frequently, the known circuit arrangements are relatively simple detectors arranged for swamping out the modulation thereby leaving an electric level indicative of carrier being received. Frequently, the function is limited to one modulation product, for example, mark signal, in an attempt to lessen the effect of noise in the process. Examples of the digital demodulation and carrier detect are given in the following U.S. patents:

| | | | |
|---|---|---|---|
| 3,548,328 | 12/1970 | Breikss | 329/126 |
| 3,600,680 | 8/1971 | Maniere et al | 325/18 |
| 3,746,993 | 7/1973 | Ahmed et al | 325/320 |
| 3,766,479 | 10/1973 | Thalimer et al | 325/320 |

The patents to Breikss and to Maniere and Meile are directed to a digital FM discriminator circuitry using counting circuits for demodulating the signal wave for the information transmitted thereby. Clocking pulse trains are counted during intervals prearranged for conveying the information and for deriving control signals for operating this counting and evaluating circuitry. The components described are conventional and useable with carrier detect circuit schemes, but other than the resultant demodulation of the carrier borne signal, no carrier detect function is performed in either arrangement.

The patent to Ahmed and Glazer is directed to frequency dependent circuitry wherein phase lock circuits are tuned to mark signal frequency and mark/space signal frequencies, but other than for tuning there is no time measuring and/or counting function performed.

The patent to Thalimer and Son is directed to a carrier detection circuit and recognizes the noise problem. The circuit described, however, uses analog filter circuits for separating noise and signal and passes the signal with noise intact to a FSK receiver when mark signal overrides noise; no time measuring function is performed.

Accordingly to the invention, the objects indirectly referred to hereinbefore and those that will appear as the specification progresses obtain in electronic logical circuitry operating on the principle that a phase or frequency modulated data signal that has been bandpass filtered and limited will have a preponderance of transitions spaced within certain limits, while many of those produced by noise will be outside these limits.

The receiving circuit comprises an input bandpass amplifying and limiting stage. All of the signal transitions and some noise are delivered by this stage, but much of the noise present on the incoming circuit is eliminated or at least considerably attenuated. The signal transitions are presented to a counting circuit to which clocking pulse transitions of repetition rate relatively greater than the signal transition repetition rate are applied by a plural stage control circuit. Between input transitions, the counter will count to approximately $$(F \times T) - (N + 1) \tag{1}$$

where
F is the clock frequency,
T is the time between transitions and
N is the number of flip-flop circuits in the control circuit.

Assuming there is phase continuity in switching, data transitions for either FM or PM waveforms will be (ideally) spaced by one of two time periods $T_1$ and $T_2$. Allowing a margin for noise and distortion, nearly all transitions of the received signal will be spaced between either $$T_1 \pm K_1 \text{ or } T_2 \pm K_2 \tag{2}$$

where $K_1$ and $K_2$ are constants dependent upon the transmission medium and ideal transition spacing, that is, a relatively quiet channel with low distortion would have $K_1$ and $K_2$ as small percentages of $T_1$ and $T_2$ respectively while a larger value would be required for a noisy and/or high distortion channel. The clock frequency F is chosen such that 1/F is much less than the minimum transition spacing. The number of clock pulses counted is defined by the formula $$(F \times T) - (N + 1) \tag{3}$$

where T is the minimum and maximum transition spacings ($T_1 \pm K_1$ and $T_2 \pm K_2$). If the time between any two transitions falls between these limits, the circuit is arranged to indicate "interval ok" and another counter will be incremented by one count; if not, the second counter will decrement by N counts. Carrier detect will be indicated when second counter has counted to $$2^{(n-1)}, \tag{4}$$

where n is the number of stages of the second counter. The second counter will continue to count up to the maximum count ($2^n - 1$) as additional properly spaced transitions are detected. A number of improperly spaced transitions can then occur without resulting in lowering the electric level indicative of "carrier detect". It is seen that the logic has an integrating effect in that occasional bursts of noise and/or temporary excessive distortion of the data signal will not change the state of "carrier detect". In a like manner, a number of properly spaced transitions may occur when no message is being received without causing the "carrier detect" level to go up.

Figure 2:
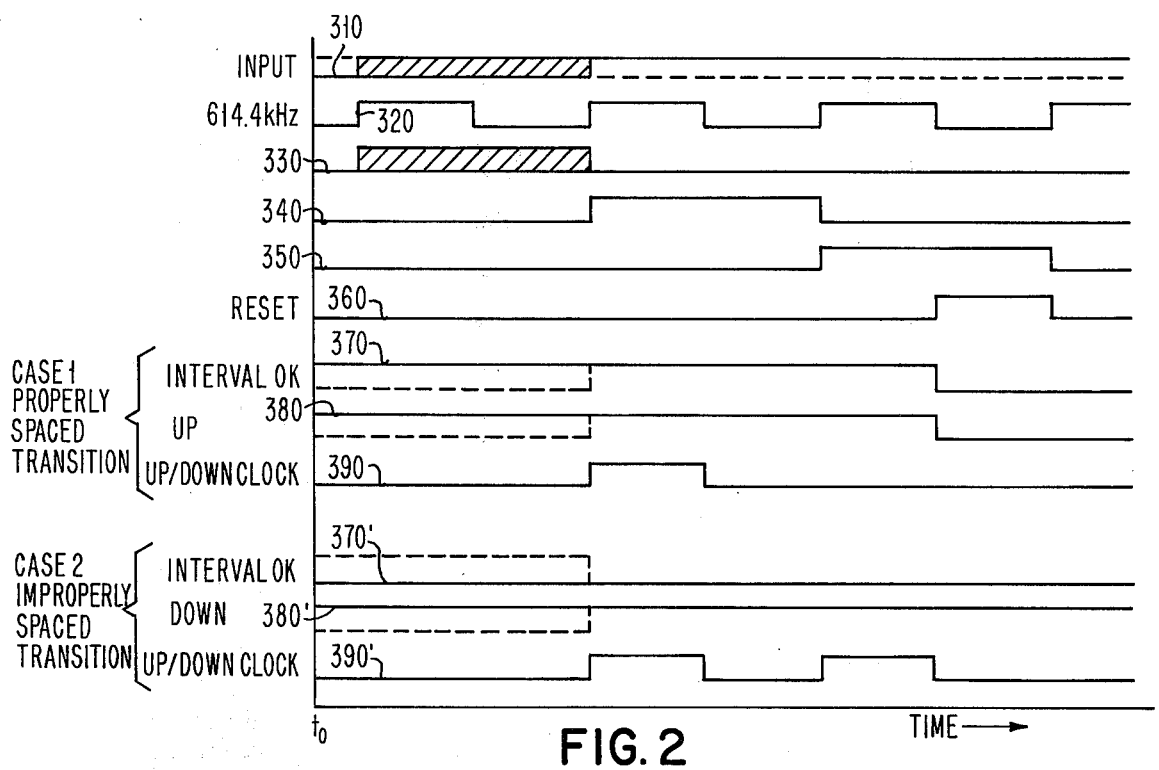

In order that full advantage of the invention obtain in practice, a preferred embodiment thereof, given by way of example only, is described hereinafter with reference to the accompanying drawing, forming part of the specification, and in which:

FIG. 1 is a functional diagram of carrier detect circuitry according to the invention; and FIG. 2 is a graphical representation of waveforms useful in an understanding of the carrier detect circuitry according to the invention.

A functional logical diagram of carrier detect circuitry according to the invention is shown in FIG. 1. For ease of understanding, a conventional source of complementary clocking pulse waves is shown as a binary flip-flop circuit 70 for applying complementary waves at terminals 72 and 74. An input signal is applied at input terminals 20,22. The input signal is normally processed in analog circuitry (not shown) in the form of conventional bandpass amplifying circuitry and conventional limiting circuitry connected in cascade. The input terminal 20 is connected directly to an Exclusive OR (XOR) gating circuit 210 and indirectly through a delay element 212 to that same XOR gating circuit. The delay element 212 is arranged to delay the signal sufficiently to allow setting the flip-flop circuit 214 and may be any suitable conventional time delay device. Two or four inverter circuits connected in series form but one of many suitable delay arrangements. The output of the XOR 210 is applied to the set terminals of a flip-flop circuit 214 serving as a latch. The Q output terminal of this latching flip-flop circuit 214 is connected to the succeeding one 216 of a number of concatenated leading edge triggered data-clocked (D-C) flip-flop circuits 216,218,220 and 224 as shown. The actual number of the latter flip-flop circuits is dependent upon the particular modulation scheme employed, the noise encountered and the properties of the signal transmission medium, as those skilled in the art will recognize. Because the operation of the carrier detect circuit will be described for two flip-flop circuits 216,224, the intermediate states are shown in broken lines. The Q output terminal of the final concatenated flip-flop circuit 224 is connected to an AND gating circuit 228 to which another input lead is connected to the complementary clock pulse input terminal 74. The AND gating circuit 228 is connected to reset terminals of a multi-(nine) stage counting circuit 230. The input count terminals of the latter are arranged to accept a number of criteria by means of an AND gating circuit 232. One input lead of the AND gating circuit 232 is connected to the complementary clock pulse train input terminal 74 while another input lead of the AND gating circuit 232 is supplied with an electric level representative of the condition in which all flip-flop circuits 216 . . . 220 are reset. This is achieved where there are more than the one stage 216 by means of another AND gating circuit 234 connected to the P output terminals of all the concantenated flip-flop circuits 216 . . . 220 and the AND gating circuit 232. For but two D-C flip-flop stages, the P terminal of the first flip-flop circuit 216 is connected directly to the AND gating circuit 232. Four AND gating circuits 242,244,246 and 248 have multiple input leads connected to pertinent stages of the counter 230 in conventional fashion for delivering electric levels at the output of these AND gating circuits representative of four different counts. The output of one of these AND gating circuits 244 is applied through an inverting input circuit terminal 250 to the input of the AND gating circuit 232. The connection is made to inhibit further counting after the maximum acceptable count has been reached. The output lead of the AND gating circuit 242 is connected to an OR gating circuit 252. The AND gating circuit 244 is connected to another OR gating circuit 256. Similarly, the AND gating circuit 246 is connected to the first OR gating circuit 252 while the final AND gating circuit 248 is connected to the other OR gating circuit 256. The four AND gating circuits 242,244,246 and 248 are enabled simultaneously by a connection to the direct clock pulse train input terminal 72. The OR gating circuit 256 has an additional lead connected to the output lead of the AND gating circuit 228. A flip-flop circuit 258 serving as a latch has the set terminal connected to the output lead of the OR gating circuit 252, while the reset terminal is connected to the OR gating circuit 256. The Q output terminal of the flip-flop circuit indicates that the time interval between transitions is O.K. when the electric level at the latter is up. The Q output of the flipflop circuit 258 is connected to the input terminal of an AND gating circuit 262 having the output lead connected to the up-count terminal of the counter 260. The counter 260 is conventional and as shown has internal connections to conventional circuitry shown here as a NAND gating circuit 264 for developing a zero output level indicative of counter 260 being in the all ones condition. This condition is transmitted to the input of the AND gating circuit 262. Similarly, the complementary P output terminals of the flip-flop circuit 258 are connected to an AND gating circuit 268 to which a level representative of not all zeros is also presented by way of a NAND gating circuit 270. The output of the NAND gating circuit 268 is connected to the down-count terminal D of the counter 260. For enabling the counter 260, the complementary P output terminal of the flipflop circuit 258 is connected to an AND gating circuit 274 to which the output of NAND gating circuit 235 is also connected. The latter NAND gating circuit 235 is connected to the P output terminal of the flip-flop circuit 224 and the P terminals of the flip-flop circuits 216,218 and 220 through the AND gating circuit 234. The output of the AND gating circuit 274 is connected through an OR gating circuit 276 to another AND gating circuit 278. The clock pulse input terminals 72 are connected through another delay element 280, similar to the delay element 212, to the input terminals of the AND gating circuit 278 for enabling the count of the counter 260. The counter 260 has a reset terminal which is connected to reset pulse input terminals 76. This terminal is deactivated in order for the carrier detect circuitry to operate, and activated only for resetting the counter. After the reset terminal R is raised to reset the counter and 32 input pulses are counted, the output terminals 92,94 connected to the last (6th) stage of the counter 260 go up indicating that 32 properly spaced transitions have been received whereby "carrier" is present.

FIG. 2 is a graphical representation of idealized waveforms resulting in the operation circuitry according to the invention for one example with properly spaced transitions and another example where the transitions are improperly spaced. For this example N=2, thus flip-flop circuits 216 and 224 are interconnected, and flip-flop circuits 218 and 220 and the AND gating circuit 234 are not required. The direct input to the XOR gating circuit 210 is represented by a curve 310. The erect timing wave at the terminal 72 is represented by the following curve 320. The waveform appearing at the Q output terminal of the latching flip-flop circuit 214 is represented by a curve 330 while the following curve 340 represents a wave appearing at the Q output terminal of the following flip-flop circuit 216. The waveform appearing at the Q output terminal of the flip-flop circuit 224 is then represented by a curve 350. The output of the AND gating circuit 228 for resetting the nine-stage counter 230 and the flip-flop circuit 258 is represented by a curve 360. The output at the Q output terminal of the flip-flop circuit 258 is represented for the two cases by the "interval OK" Up and Down level curves 370 and 370' respectively. The output of the AND gating circuit 278 is represented for the two cases by curves 390 and 390' respectively. Curves 380 and 380' represent the waveform at the up U and the down D count terminals respectively for the two cases illustrated.

In operation, conventional input circuitry drive input terminals 20 and 22 in order to filter out all frequencies outside the frequency band of the received data signal for optimum signal-to-noise ratio and for rejection against distortions and echoes. The carrier detect logical circuitry serves to disable the receiver when no data signal is being received. As mentioned hereinbefore, the carrier detect logical circuitry operates on the principle that a phase (or frequency) modulated signal that has been filtered and limited will have a preponderance of transitions spaced within certain limits while many of those produced by noise will be outside these limits. An ideal binary phase modulated data signal using an 1800 Hz carrier and switching at zero will have zero crossings spaced by either 278 or 555 microseconds. Allowing a reasonable margin for the effects of distortion and noise, nearly all the transitions of this input signal can be assumed to be spaced by either 195 to 361 microseconds or 430 to 681 microseconds if a data signal is being received. If either condition is met, the "interval OK" electric level at the Q output terminal of the flip-flop circuit 258 will be up when the up/down counter 260 receives its clock input and the counter will increment by one count. If neither condition is met, the counter 260 will decrement by two counts. About 9 milliseconds after the beginning of the reception of a data signal, the count will reach 32 and the "carrier detect" electric level at terminals 92,94 will go up. Additional properly spaced transitions will result in counting higher (to a maximum count of 63). A number of improperly spaced transitions can then occur without resulting in lowering the "carrier detect" electric level. Thus, it is seen that the logic employed imparts an integrating effect whereby occasional bursts of noise or excessive distortion of the data signal will not change the state of the "carrier detect" level. In a like manner, a number of properly spaced transitions may occur when no message is being received without causing the "carrier detect" to go high.

Referring to FIG. 1, the AND gating circuits 246,248,242 and 244 are connected to the stages of the counter 230 for sensing counts respectively corresponding to $T_{1min}$, $T_{1max}$, $T_{2min}$ and $T_{2max}$ respectively. For the circuit as described hereinbefore counts of 118,220,261 and 418 respectively are sensed. For this count only the two flip-flop stages 216 and 224 are required and they are wired directly together from the Q terminal of the first stage 216 to the D terminal of the stage as described earlier; the intermediate stages 218 and 220 and the AND gating circuit 234 are unnecessary here.

The carrier detect circuit as described hereinbefore has been built and tested as part of a modem used for transmitting and receiving data over telephone lines. The input signal was a 1200 baud phase modulated, 1800 Hz carrier signal which has been filtered and limited. The clock period is 1.63 microseconds for the frequency F of 614.4 KHz; $T_1$ and $T_2$ are 277.8, 555.6 microseconds; $K_1$ and $K_2$ are 83.3 and 124.9 microseconds respectively, and N was 2 (the latching circuit 214 is not counted for evaluating N) which accounts for only the three waveforms 330,340 and 350 in FIG. 2.

The circuit is particularly well suited for semiconductor fabrication, especially the Large Scale Integration (LSI) implementation.

While the invention has been described and illustrated in terms of a preferred embodiment, and some alternative structure has been offered, it is to be clearly understood that those skilled in the art will make additional changes without departing from the spirit and scope of the invention as defined in the appended claims concluding the specification.

The invention claimed is:

1. Digital carrier wave detect circuitry for digital data communications receiving circuitry, comprising input terminals at which at least the train of transitions of a digital data modulated carrier wave signal is applied, output terminals at which a signal level indicative of said carrier wave detected is presented, inputting terminals at which a clock pulse train is applied having a number of impulses greater than the number of said transitions of said wave for a given period of time, a counting circuit having reset, input and output terminals, AND gating circuitry connected to said output terminals of said counting circuit and having output terminals at which electric levels are delivered for a plurality of predetermined counts corresponding to the appearance of said transitions in said modulated wave with respect to said impulses of said clock pulse train, control circuitry connected to said input terminals, to said inputting terminals and to said reset and input terminals of said counting circuit for gating said clock impulses to said counting circuit for counting clock impulses between transitions of said modulated wave, and output circuitry coupled between said AND gating circuitry output terminals and said signal level output terminals and responsive to a predetermined count for indicating properly spaced transitions.

2. Digital carrier wave detect circuitry as defined in claim 1 and wherein said output circuitry comprises a latching flip-flop circuit having set, reset, and complementary output terminals, and said AND gating circuitry comprises at least two AND gating circuits having output leads individually connected to said set and reset terminals of said flip-flop circuit.

3. Digital carrier wave detect circuitry as defined in claim 2 and wherein said AND gating circuitry comprises at least two additional AND gating circuits having output leads individually connected to said set and reset terminals of said flip-flop circuit, whereby one of two different counts is effective to set said flip-flop circuit and one of two other different counts is effective to reset said flip-flop circuit.

4. Digital carrier wave detect circuitry as defined in claim 3 and wherein an OR gating circuit is interposed between the set terminal of said flip-flop circuit and the two AND gating circuits connected thereto, and another OR gating circuit is interposed between the reset terminals of said flip-flop circuit and the other two AND gating circuits.

5. Digital carrier wave detect circuitry as defined in claim 4 and wherein
said output circuitry further comprises
a bidirectional counting circuit having output terminals connected to said signal level output terminals, up-count terminals connected to the erect output terminals of said latching flip-flop circuit, down-count terminals connected to the complementary output terminals of said flip-flop circuit and counting pulse input circuitry, and
said control circuitry further comprises circuitry connected between said inputting terminals and said counting pulse input circuity for applying clocking impulses to said bidirectional counter under control of said flip-flop circuit.

6. Digital carrier wave detect circuitry as defined in claim 5 and wherein
said bidirectional counting circuit has one auxiliary output terminal delivering an output corresponding to a condition of not all binary ones and another auxiliary output terminal delivering an output corresponding to a condition of not all binary zeros,
an AND gating circuit having input and output leads interposed between said up-count terminal and said flip-flop circuit and having another input lead connected to said one auxiliary output terminal,
another AND gating circuit having input and output leads interposed between said down-count terminal and the other output terminal of said flip-flop circuit and having another input lead connected to said other auxiliary output terminal.

7. Digital carrier wave detect circuitry as defined in claim 1 and wherein
said control circuitry comprises
an exclusive OR (XOR) gating circuit having an input terminal connected to one of said input terminals, another input terminal, and an output terminal,
a delay circuit connected between said input terminals and said other input terminal of said XOR gating circuit,
a latching flip-flop circuit having a set terminal connected to said output lead of said XOR gating circuit, a reset terminal and an output terminal,
at least two concatenated edge triggered flip-flop circuits each having data, clock and complementary output terminals with the data terminal of the first of said concatenated flip-flop circuit connected to the output terminal of said latching flip-flop circuit and the interconnection of the first and second concatenated flip-flop circuits also connected to the reset terminal of said latching flip-flop circuit, and the clock terminals of all of said concatenated flip-flop circuits connected to said inputting terminals,
an AND gating circuit having one input terminal connected to the output terminal of the final flip-flop circuit, another input terminal connected to said inputting terminals and having an output lead connected to the reset terminal of said counting circuit,
another AND gating circuit having an output lead connected to said input terminal of said counting circuit, one input terminal connected to said complementary output terminals of said first concatenated flip-flop circuit, and another input lead connected to said inputting terminals.

8. Digital carrier wave detect circuitry as defined in claim 7 and wherein
said other AND gating circuit has another input lead with an inverting circuit therein connected to an output terminal of said AND gating circuitry.

9. Digital carrier wave detect circuitry as defined in claim 7 and having
at lease three concatenated edge triggered flip-flop circuits, and
a plural input AND gating circuit having a plurality of input leads connected individually to the complementary output terminals of all of said concatenated flip-flop circuits save the last and having an output lead connected to said one input lead of said other AND gating circuit.

10. Digital carrier wave detect circuitry as defined in claim 5 and wherein
said control circuitry further comprises
an AND gating circuit having an output lead in said bidirectional counting circuit pulse input circuitry, one input lead coupled to said output terminal of said first of said concatenated flip-flop circuits and another input lead,
a delay circuit connected between said other input lead and said inputting terminals.

11. Digital carrier wave detect circuitry as defined in claim 10 and wherein
said control circuit further comprises
an OR gating circuit interposed between said one input lead of said AND gating circuit and said first flip-flop circuit and having another input lead, and
an AND gating circuit having an output lead connected to said other input lead of said OR gating circuit, one input lead connected to said complementary output terminal of said latching flip-flop circuit, and another input terminal coupled to a NAND gating circuit having input leads connected to the complementary output terminals of said first and last flip-flop circuits of said concatenated flip-flop circuits.

12. Digital carrier wave detect circuitry for digital data communications receiving circuitry, comprising
input terminals at which a digital data modulated carrier wave signal is applied,
output terminals at which a signal level indicative of carrier detected is presented,
a delay circuit connected to said input terminals,
an exclusive OR (XOR) gating circuit connected to said input terminals and to said delay circuit and having an output terminal at which transitions and noise pulses passing said input terminals and reappearing at the output of said XOR gating circuit appear,
a latching flip-flop circuit having a set terminal connected to the output terminal of said XOR gating circuit, a reset terminal, and at least one output terminal,
a number of concatenated flip-flop stages each having data, clock, and complementary output terminals, with the data terminal of the first stage connected to said one output terminal of said latching flip-flop circuit, with the erect output terminal of the first stage connected to the reset terminal of said latching flip-flop circuit, and with the erect terminal of each stage save the last stage connected to the data terminal of the succeeding stages,
a set of complementary timing wave inputting terminals at which a source of complementary timing waves is applied with the terminals for the primary timing wave connected in common to the clock terminals of said concatenated flip-flop stages, a forward counter circuit having count input, reset and output terminals, four AND gating circuits having output terminals and having a multiple of input terminals permutated among said output terminals of said counter circuit for delivering output levels individual to said AND gating circuits and indicative of the maximum and minimum counts of two predetermined ranges of counts corresponding to said digital data conveyed by said signal, another latching flip-flop circuit having set, reset and complementary output terminals with one set of output terminals coupled to said carrier detect output terminals, an OR gating circuit connected to said set terminals of said latching flip-flop circuit and having input terminals individually connected to the output terminals of said AND gating circuits indicative of said predetermined minimum counts, another OR gating circuit connected to said reset terminals of said latching flip-flop circuit and having input terminals individually coupled to the output terminals of the other of said AND gating circuits, a counter input AND gating circuit having an output lead connected to the input terminals of said counter circuit and having at least three input leads with an inverting input circuit in one of said leads, a connection from the output terminal of the one AND gating circuit indicative of the greater of said maximum predetermined counts to said inverting input circuit, and another AND gating circuit having one input lead connected to the complementary timing wave inputting terminals for the secondary wave, another input connected to the output terminal of the last flip-flop stage of said concatenated flip-flop stages and an output lead connected to another input lead of said counter input AND gating circuit.

13. Digital carrier wave detect circuitry as defined in claim 12 and incorporating a further AND gating circuit having an output lead connected to another input lead of said counter input AND gating circuit and input leads connected to the complementary output terminals of all of said flip-flop stages save the last.

14. Digital carrier wave detect circuitry as defined in claim 12 and incorporating a bidirectional counter having one input terminal for counting in one direction, another input terminal for counting in the other direction, a count input terminal, output terminals connected to said signal level terminals, and terminals at which outputs signifying not all zeros and not all ones are presented, AND gating circuitry connected to said one input terminal and having input leads connected to said terminals signifying not all ones and to the output terminals of said latching flip-flop circuit indicative of said properly spaced transitions, other AND gating circuitry connected to said other input terminal and having input leads connected to said terminals signifying not all zeros and to the other output terminals of said latching flip-flop circuit, and further AND gating circuitry having an output lead connected to said count pulse input terminal and having an input lead coupled to said primary timing wave input terminals, and other input lead coupled to said output terminal of said first flip-flop stage.

15. Digital carrier wave detect circuitry for digital data communications receiving circuitry, comprising input terminals at which at least the train of transitions of a digital data modulated carrier wave signal is applied, output terminals at which a signal level indicative of said carrier wave detected is presented, inputting terminals at which a clock pulse train is applied having a number of impulses greater than the number of said transitions of said wave for a given period of time, a counting circuit having reset, input and output terminals, comparing circuitry connected to said output terminals of said counting circuit and having output terminals at which electric levels are delivered for a plurality of predetermined counts corresponding to the appearance of said transitions in said modulated wave with respect to said impulses of said clock pulse train, control circuitry connected to said input terminals, to said inputting terminals and to said reset and input terminals of said counting circuit for gating said clock inpulses to said counting circuit for counting clock impulses between transitions of said modulated wave, and output circuitry coupled between said comparing circuitry output terminals and said signal level output terminals and responsive to a predetermined count for indicating properly spaced transitions.

* * * * *